United States Patent [19]

Wallaert

[11] Patent Number: 5,436,788
[45] Date of Patent: Jul. 25, 1995

[54] ELECTRONIC CONTROL APPARATUS FOR THE SWITCHING OF SEVERAL ELECTRICAL LOAD RESISTANCES AND MONITORING INFORMATION SWITCH POSITIONS

[75] Inventor: Johan Wallaert, Assebroek, Belgium

[73] Assignee: Clark Equipment Company, South Bend, Ind.

[21] Appl. No.: 987,743

[22] Filed: Dec. 9, 1992

[30] Foreign Application Priority Data

Dec. 10, 1991 [DE] Germany .................. 41 40 587.0

[51] Int. Cl.$^6$ .............................................. H01H 9/00
[52] U.S. Cl. ............................... 361/160; 307/38; 361/189
[58] Field of Search ................ 307/11, 31, 38; 361/160, 170, 189, 190

[56] References Cited

U.S. PATENT DOCUMENTS 4,418,333 11/1983 Schwarzbach et al. ........ 340/825.07
4,608,561 8/1986 Kojima et al. ................. 340/825.52
5,006,724 4/1991 Liu ................................... 307/11

FOREIGN PATENT DOCUMENTS 4015271 11/1991 Germany .

OTHER PUBLICATIONS

Siemens Publication "Smart SIPMOF Intelligent Power Switch", 1988.

Primary Examiner—Jeffrey A. Gaffin
Attorney, Agent, or Firm—Watts, Hoffmann, Fisher & Heinke Co.

[57] ABSTRACT

An electronic control apparatus (13) switches several electrical load resistances (16), in particular the solenoid valves of a power shift gear, depending on the position of various information switches (19). The electronic control apparatus (13) has a plurality of load lines (17) each leading to a load resistance (16), and a central unit (15) having a plurality of electronic switches (1). Each of the load lines (17) can be connected via an electronic switch (1) to a supply voltage (14). The electronic switches (1) can each be switched by a logical signal and each has an output (5) for a logical status signal. The logical status signal indicates an open load resistance when the switch is open and a short-circuited load resistance when the switch is closed with an open, short-circuited switch (1), the status signal suggests an open load resistance. The electronic control apparatus (13) monitors the position of the information switches (19). Each of the information switches (19) is coupled between an information line (18) and a respective load line (17). The information line (18) is connected to an output terminal (3) of one electronic switch (1). To ascertain the position of the information switches (19), the information line connected electronic switch (1) is closed and each of the electronic switches (1) connected to a load line is opened. A load line information switches (1) having an open information switch (19) coupled to its load line (17) will generate a logic high signal at its switch status output (5) while a load line information switch (1) having a closed information switch (19) coupled to its load line (17) will generate a logic low signal at its switch status output (5).

7 Claims, 3 Drawing Sheets

ELECTRONIC CONTROL APPARATUS FOR THE SWITCHING OF SEVERAL ELECTRICAL LOAD RESISTANCES AND MONITORING INFORMATION SWITCH POSITIONS

FIELD OF THE INVENTION

This invention relates to an electronic control apparatus for controlling the switching of a plurality of electrical load resistances and monitoring the position of a plurality of information switches and, more particularly, to an electronic control apparatus wherein switch status output signals from electronic load switches are utilized to monitor information switch positions.

BACKGROUND ART

A power shift gear typically includes a number of solenoid valves. Each solenoid valve is actuated, i.e., opened and closed, by a respective electronic switch electrically coupled thereto. An electronic control apparatus including the respective electronic switches may be used to control the switching sequence of the solenoid valves in response to a position of a shift selector lever. In order to, for example, switch the solenoid valves of a power shift gear in a purposeful way, it is frequently not sufficient that the control apparatus actuates the individual solenoid valves purely depending on the position of a selector lever. Rather, it is advisable, and indeed sometimes absolutely necessary, to take into account the position of various information switches, which may be arranged at different positions outside the electronic control apparatus. The electronic control apparatus must, therefore, be capable of reading in the position of these information switches.

With a known control apparatus of the above-mentioned type, the control apparatus is connected via information lines to the individual information switches. Closing the information switches has the effect of applying a voltage to the information lines which is registered by the control apparatus. Major problems occur if the electronic control apparatus needs to be interchangable. In this case, at least one contact has to be provided at the connecting plug(s) for each information switch. This then plays a particular role if, with an existing electronic control apparatus, all contacts are in use and the number of information switches is to be increased. In this case it takes, as a rule, a great deal of technical effort to design a new plug or provide an additional plug respectively.

The electronic switches used in the known electronic control apparatus described here are known inter alia from the data sheet "Smart SIPMOS BTS 412 A" (1988, Siemens, B4, pp. 1/12 through 12/12). The status signal of these switches permits monitoring of electrical resistance loads through the control apparatus. In particular, with an open switch, an open, i.e. incorrectly connected load resistance, and with a closed switch, a short-circuited load resistance is detected, i.e. a potential source of danger for the supply voltage. For this information, no additional information lines between the load resistances and the control apparatus are necessary. Rather, said information can be obtained from the control apparatus via the corresponding load lines.

A circuit arrangement for the inquiry of switch positions is known from DE-US 40 15 271, whereby a multitude of information switches is provided. The information switches are on the one hand connected to a fixed potential and on the other hand via an information line to a microcomputer as well as a resistor. The side of the resistors facing away from the information switches can in turn be connected via switches controlled by the microcomputer to a potential which deviates from the fixed potential. In this manner, the voltage drop across the measururing instrument setup can be raised during the reading-in of the positions of the information switches in such a way that a signal, well above the noise, is registered by the microcomputer. On the other hand, linked with this, the occurence of a comparatively large leakage current is avoided for those time periods in which the position of the information switches is not read in. With the known circuit arrangement, on average more than one line stemming from the microcomputer is provided for reading-in from one switch.

SUMMARY OF THE INVENTION

It is the object of the invention to demonstrate an electronic control apparatus of the aforementioned type in which the position of a multitude of information switches can be inquired with as few additional lines as possible.

The invention refers to an electronic control apparatus for the switching of several electrical load resistances, in particular the solenoid valves of a power shift gear, depending on the position of various information switches, having a multitude of load lines each leading to a load resistance and a central unit with a multitude of electronic switches, whereby each of the load lines can be connected via an electronic switch to a supply voltage, and whereby the electronic switches can each be switched by a logical signal and each has an output for a logical status signal which indicates, with an open switch, whether an open load resistance is present, and with a closed switch, whether a short-circuited load is present, as well as with an open, but short-circuited switch independent of the load resistance, specifies the presence of an open load resistance.

According to the invention this is achieved in that at least one information line is provided which, like the load line, is connected via one of the electronic switches to a supply voltage and leads out from the central unit, and that the information line is connected to at least one load line (each via one of the information switches). Therefore, the position of the respective information switch can be determined by means of the status signal of the electronic switch allocated to the load line. For this, this electronic switch is to be opened and the electronic switch allocated to the load line to be closed. Now the status signal of the electronic switch allocated to the load line indicates an open load resistance when the information switch is closed. In contrast, with an open information switch and an error-free load resistance, no error meassage from the status signal occurs. The control apparatus is, therefore, able to determine the position of the information switches through coordinated actuation of the electronic switches and subsequent reading-in of the status signals without there being the need for a total of more than one single information line. This one information line is normally present in the known control apparatus according to the state-of-the-art in order to be able to read in the position of at least one information switch, even with a limited number of contacts in the connecting plug. With the new control apparatus, this information line can now be used for monitoring several information switches. The only extra component required for this is the electronic switch allocated to the information line.

Each information switch can be wired in series with a diode. This measure is necessary in order to isolate the individual load lines from each other. Without the diode it is possible that upon closing one of the electronic switches allocated to a load line, various unwanted load resistances are activeated provided the corresponding information switches are closed. It is clear that the diodes are arranged in such a way that their transmission direction coincides with the direction of the information line to the respective load line.

Several information lines which are connected via various information switches to the same load lines may be provided. It is possible to read in the position of various information switches via just one load line. For this, various information lines are necessary, each of which may be connected via an electronic switch to the supply voltage. It is clear that the electronic switches allocated to the information lines are only closed alternately. Otherwise, a status signal indicating an open load resistance would not allow any conclusions to be drawn regarding the position of a certain information switch.

The information switches are to have two insulated terminals. Such switches are also designated as floating.

The load lines connected to the information lines can lead to slow load resistances. Reading-in of the positions of the information switches can be carried out using such a speed that with a passive load resistance which is switched on, the brief opening of the electronic switch allocated to this is not registered or hardly registered. The function of the load resistance is, therefore, not impaired by the monitoring of the information switches.

DETAILED DESCRIPTION OF THE PRESENT INVENTION

Figure 1:
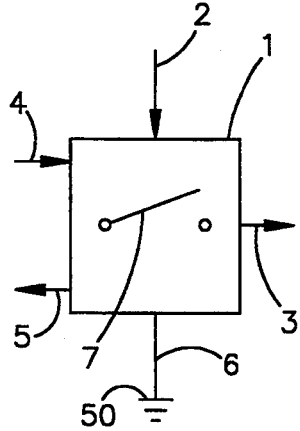
FIG. 1 is a schematic diagram an electronic switch of the type utilized in an electronic control apparatus of the present invention.

Turning to FIG. 1 electronic switch 1 and includes an input 2 which is connected to a supply voltage, Vs, 14 and an output 3 connected to a load resistor 16 (note that load resistor 16 is not part of the switch 1). In addition, an input 4 is provided for applying a logical signal for the switching of the electronic switch 1. A logical status signal is applied to an output 5 of the electronic switch 1. Apart from that, a ground connection 6 is provided for coupling the switch 1 to ground 50. A switch symbol 7 indicates whether the electronic switch 1 is closed or open. The switch symbol 7 is not a component of a real embodiment version of the electronic switch 1. However, in the following it serves to explain the method of operation of the new electronic control apparatus.

Figure 2:
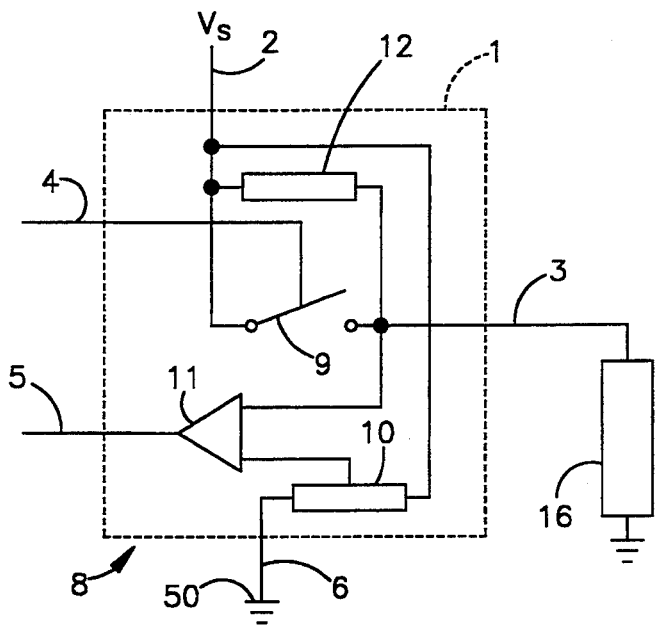
FIG. 2 is an equivalent-circuit diagram for the electronic switch of FIG. 1.

The equivalent-circuit diagram 8 for the electronic switch 1 according to FIG. 1 illustrates how the logical status signal is generated at the electronic switch 1 for the switch status output 5. For this, high resistance resistor 12, bypassing the actual switching position 9, a voltage divider 10 between input 2 of the supply voltage Vs, and 14 the ground connection 6, as well as a comparator 11 are provided. The comparator 11 compares a voltage Vout applied to output 3 with a voltage Vref picked up on an output side of the voltage divider 10. If Vref exceeds Vout then an output of the comparator 11 goes logic high, that is, a signal resulting in a logic level of one. Since the output of the comparator coupled to the switch status output 5, when the comparator 11 is logic high the switch status output 5 is logic high as well. If Vout exceeds Vref, the comparator output goes logic low, that is, a signal resulting in a logic level of zero, and, accordingly, the switch status output 5 would be logic low as well. When the electronic switch 1 is open, no current flows through the switching position 9 and the value of Vout is small as compared to Vs assuming that a resistance of the load resistance 16 (e.g., a solenoid) coupled to the load output 3 is small in comparison to the resistance of the high resistance resistor 12. Since Vout is relatively small it will be exceeded by Vref and the output of the comparator 11 will be logic high, that is, a logic level of one, therefore, the switch status output 5 will also be logic high. A logic high signal at the switch status output 5 is indicative of a "normal condition." If the load resistance 16 is faulty or incorrectly connected such that the load output 3 is connected to an open circuit then only a small part of the voltage applied by input 2 drops across switching position 9. In this case the comparator 11 output drops to logic low and the signal at the switch status output 5 similarly drops to logic low. Here, 'one' indicates the 'functioning correctly' condition and 'zero' a faulty condition for the load resistance. When the switch 1 is closed, i.e. switching position 9 is by-passed, the voltage applied to output 3 should be the same as at input 2. When the electronic switch 1 is closed, it is desired that a short circuit connection between load output 3 and ground 50 result in a logic low signal at the switch status output 5 indicative of a fault condition. Such a short circuit connection may result from a short in the load resistance 16. If the connection between the load output 3 and ground 50 through the load resistance 16 is not short circuited, the switch status output 5 is desired to have a logic high signal. The electronic switch schematic diagram shown in FIG. 2 will generate the desired logic level signal values at the switch status output 5 when the switch is open (i.e., logic low at the output 5 when the connection through the load resistance 16 is open indicative of a fault condition and logic high at output 5 when the connection through the load resistance is not an open indicative of a "functioning properly" condition). However, the switch 1 as shown in FIG. 2 will not generate the desired logic level signal values at the switch status output 5 when the switch is open. This is because the switch 1 shown in FIG. 2 is not complete and additional components are required. As configured in FIG. 2, switch 1, when closed, would generate a high logic signal at the switch status output 5 when a short circuit existed between the load resistor output 3 and ground, while a low logic signal would be generated at the switch status output 5 when the load resistance 16 was not short circuited. These results, of course, are exactly the opposite of what is desired, i.e., a high logic signal value at output 5 when the load resistance 16 is not short circuited (circuit functioning correctly) and a low logic signal value at output 5 when the load resistance is short circuited (circuit not functioning correctly). However, the referenced electronic switch, the Siemens Smart SIPMOS BTS 412 A Intelligent Power Switch, generates the desired logic signal values at the switch status output 5 under both the open and closed switch positions (as can be seen in a truth table for the BTS 412 A switch on page 7 of the switch's specification sheets). In relevant part, the BTS 412 A truth table provides:

| Condition | Input Voltage | Switch Status |
|---|---|---|
| Normal Operation | Low (Open Swtch) | High |
| Normal Operation | High (Closed Swtch) | High |
| Open load | Low (Open Swtch) | Low |
| Short circuit | High (Closed Swtch) | Low |

Thus, in the preferred embodiment of applicant's invention, the electronic switches 1 are Siemens Smart SIPMOS BTS 412 A Intelligent Power Switches.

Figure 3:
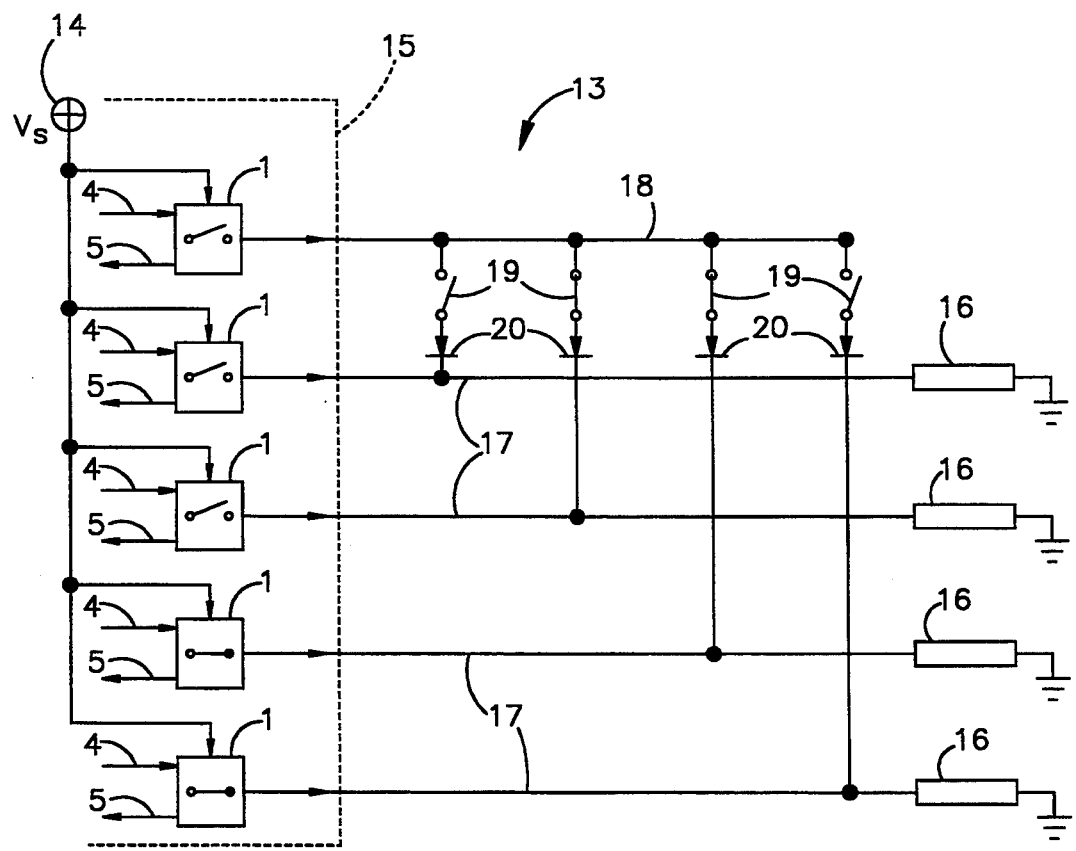
FIG. 3 is a schematic diagram of the electronic control apparatus of the present invention.

The electronic control apparatus of the present invention is shown generally at 13 in FIG. 3 and includes a central unit 15 having a plurality of electronic switches 1. The electronic switches 1 correspond to FIG. 1, whereby the presentation of the grounding 6 was omitted. The electronic switches 1 connect load resistances 16 via load lines 17 to a supply voltage 14. This is valid with the exception of one electronic switch 1, the output side of which is connected to an information line 18. The information line 18 is connected via information switches 19 to each of the load lines 17. Diodes 20 are wired here in series with the information switches 19, whereby the transmission direction of said diodes runs from the information line 18 towards the load lines 17. With the electronic control apparatus 13 in the version shown it is possible to switch four load resistances and in doing this, to take into account the position of four external information switches 19. A total of just five lines are provided for this purpose. Accordingly, it would only be necessary to provide a 6-pin plug for the detachable connection between central unit 15 and load resistances 16, whereby the sixth pin would be a common ground.

Figure 4:
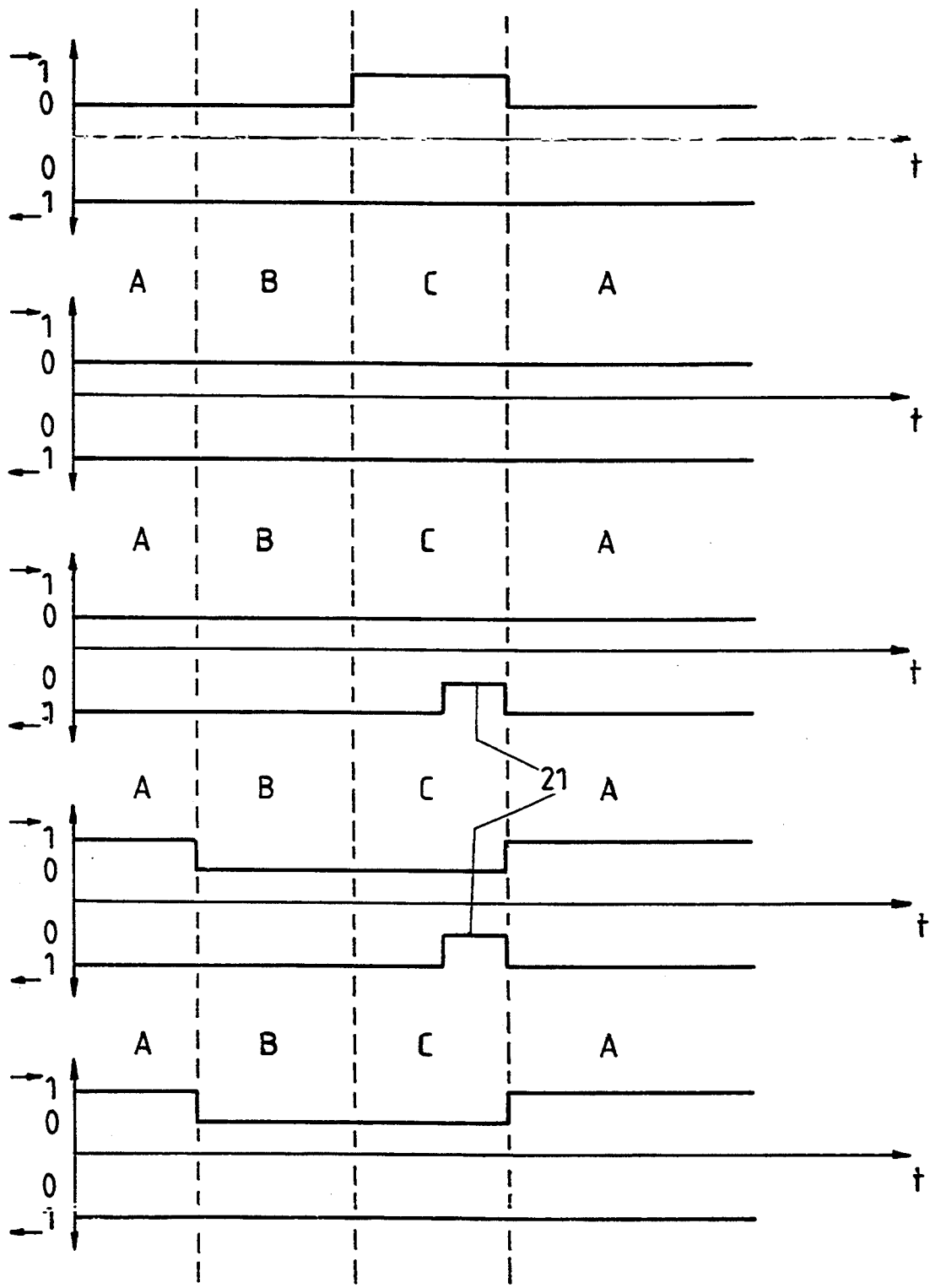
FIG. 4 illustrates switch status output signal timing diagrams for the set of electronic control switches shown in FIG. 3 over a time period wherein the respective positions of a set of information switches are monitored.

FIG. 4 shows which signals are applied to the inputs 4 and the outputs 5 of the switch 1 according to FIG. 3 when reading in the position of the information switches 19. It should be noted here that the position of the information switches 19 can then only be determined if all load resistances 16 are functioning correctly. However, this can be easily checked upon reading in the position of the information switches 19. Reading in the position of the information switches 19 is performed at brief time intervals B, C which interupt the normal control A of the load resistances 16. The signals reproduced for the segment A in FIG. 4 correspond exactly to the condition of the electronic control apparatus 13 according to FIG. 3. Accordingly, a signal '1' is applied to the inputs 4 of the two lower switches, while a signal '0' is applied to the inputs 4 of the other electronic switches 1. All load resistances 16 are functioning correctly so that the status signal stands at '1' at all outputs 5. In the first phase B of time interval B, C, the two lower switches 1 are now also opened. Following this, in the second phase C, the uppermost electronic switch 1, connected to the information line 18, is closed. An error message 21 results from this for the second and third electronic switches i from the bottom because the two middle information switches 19 are closed. For the open, outer information switches 19 the status signal at the output 5 of the associated electronic switch 1 remains at '1' accordingly. After the second phase C of time interval B, C, all switches 1 are transfered back to the original position according to FIG. 3. Now present in the central unit 15 is the information that the two middle information switches 19 are closed, while the position of the two outer ones is open. Approx. 1 ms is required for reading in this information. This is based on an access time of 300 μs for the status signal to possible faults. A voltage interuption of 1 ms is not normally registered by passive load resistances 16. Slow load resistances 16 are understood to be those loads whose function does not come to an abrupt end when the supply voltage is disconnected. Examples of these are magnetic coils and heating filaments. A preferred field of application for electronic control apparatuses is the switching of solenoid valves in a power shift gear.

Figure 5:
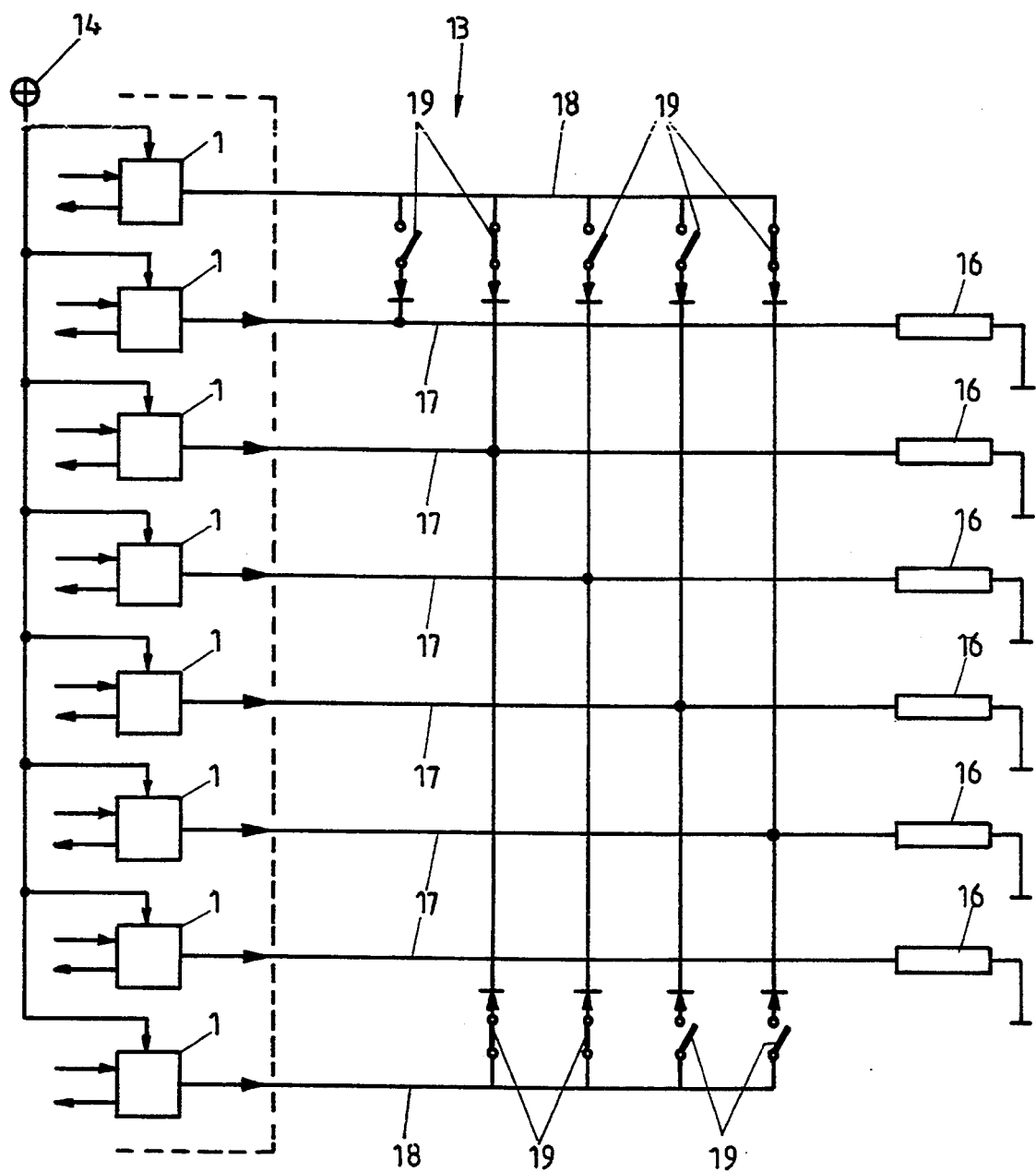
FIG. 5 is a schematic diagram of a second embodiment the control apparatus.

The embodiment version of the new electronic control apparatus illustrated in FIG. 5 has two information lines 18 besides six load lines 17. In this case some of the information lines 18 are connected with the same load lines 17 via various information switches 19. In the case under consideration, six load resistances can be controlled in this way and the position of nine information switches 19 may be read in over a total of eight lines. In fact, taking into account a further four, i.e. a total of twelve switches would be possible without any great effort. In doing this it is generally necessary that the electronic switches 1 allocated to the information lines 18 be closed one after the other. This means that for every information line 18 and the associated switch 1, a phase C according to FIG. 4 would need to be provided for reading in the position of the corresponding information switch 19. Otherwise, the changes to the status signal at a switch 1 cannot be allocated to a single information switch 19. In order to guarantee correct functioning of the electronic control apparatus 13, it should be assured that, in the extreme case, all load resistances 16 can be operated via the information lines 18. Otherwise, there is a danger of the supply voltage 14 breaking down. Further, all information switches 19 should be floating, i.e. designed with both terminals insulated.

I claim:

1. Electronic control apparatus for individually switching a plurality of electrical load resistances on and off and intermittently monitoring a position of a plurality of information switches having an open and a closed switch position, the electronic control apparatus comprising:

a) a plurality of electronic switches switchable between an open and closed position, each of said electronic switches having an output coupled to a different one of said electric load resistances and applying a signal to the load resistance coupled thereto in one of said open and closed positions and not applying a signal to the load resistance in the other of the open and closed positions thereby switching the load resistance on and off, certain of said electronic switches each having its output additionally coupled to a different information switch to monitor the switch position of the information switch, each of said electronic switches generating a switch status output signal having at least two states, a fault state and a normal state;

b) a master switch switchable between an open and closed position, the master switch coupled to each of said information switches for applying a signal said information switches when said master switch is in one of said open and closed positions;

c) an energizing means for supplying a voltage input to each of the electronic switches and the master switch; and d) a central control unit coupled to each of the electronic switches and the master switch for opening and closing the switches to switch the load resistances and intermittently monitoring the positions of the information switches by sensing the switch status output signals, the switch status output signal for a given electronic switch indicating a fault condition when said electronic switch is in the position wherein no signal is being applied to the load resistance by the electronic switch, the master switch is in the position wherein a signal is being applied to the information switches, and the information switch is in the closed position.

2. The electronic control apparatus of claim 1 wherein each information switch is series coupled with a diode.

3. The electronic control apparatus of claim 1 wherein the switch status output signal for a given electronic switch indicates a fault condition when an open circuit condition is present at the electronic switch output, the electronic switch is in the position wherein no signal is attempted to be applied to the switch's load resistance by the electronic switch and the master switch is in the position wherein no signal is being applied to the information switches.

4. The electronic control apparatus of claim 1 wherein the switch status output signal for a given electronic switch indicates a fault condition when a short circuit condition is present at the electronic switch output, the electronic switch is in the position wherein a signal is attempted to be applied to the switch's load resistance and the master switch is in the position wherein no signal is being applied to the information switches.

5. The electronic control apparatus of claim 1 wherein the master switch is an electronic switch similar to said plurality of electronic switches.

6. The electronic control apparatus of claim 1 wherein said load resistances comprise slow load resistances.

7. A method of monitoring a position of a plurality of information switches, each information switch coupled between a master switch and an output connection of a respective electronic switch, the output connection of each electronic switch also coupled to a load resistance and each electronic switch generating a switch status output signal having at least two states, one state indicative of a normal state and a second state indicative of a fault state, the steps of the method comprising:

a) determining if all load resistances are functioning properly by switching said master switch to a position such that no signal is applied to each of the information switches;

b) monitoring the switch status output signals, a signal in the normal state indicates that the load resistance coupled to that electronic switch output is functioning properly;

c) switching each electronic switch to a position such that no signal is applied to the load resistances by the electronic switches;

d) switching the master switch to a position such that a signal is applied to each of the information switches;

e) monitoring the switch status output signals, a signal in the normal state indicates that the information switch coupled to that electronic switch output is in an open position; and f) switching the master switch to the position wherein no signal is applied to the information switches; and g) returning each of the electronic switches to its position in step (b).

* * * * *